(12) United States Patent
Blake et al.

(10) Patent No.: US 8,356,634 B2
(45) Date of Patent: Jan. 22, 2013

(54) SYSTEM FOR CONTROLLING ELONGATION OF A CONDUIT WITHIN WHICH FLOWABLE MATERIAL IS CONVEYED

(75) Inventors: Brian Blake, Marion, MI (US); Chad Brunink, McBain, MI (US)

(73) Assignee: Piranha Hose Products, Cadillac, MI (US)

( * ) Notice: Subject to any disclaimer, the term of this patent is extended or adjusted under 35 U.S.C. 154(b) by 736 days.

(21) Appl. No.: 12/460,557

(22) Filed: Jul. 21, 2009

(65) Prior Publication Data

US 2011/0017335 A1 Jan. 27, 2011

(51) Int. Cl.
*F16L 55/00* (2006.01)
(52) U.S. Cl. .................. 138/108; 138/109; 138/172
(58) Field of Classification Search .............. 138/109, 138/172, 108, DIG. 8
See application file for complete search history.

(56) References Cited

U.S. PATENT DOCUMENTS

| | | | | |
|---|---|---|---|---|
| 2,277,864 | A * | 3/1942 | Horvath | 138/110 |
| 2,299,160 | A * | 10/1942 | MacPherson | 285/114 |
| 2,640,502 | A * | 6/1953 | Powers | 285/114 |
| 2,707,972 | A | 5/1955 | Cole, Jr. et al. | |
| 3,032,357 | A * | 5/1962 | Shames et al. | 285/114 |
| 3,222,092 | A | 12/1965 | Olson | |
| 3,411,454 | A | 11/1968 | Arutunoff | |
| 3,677,665 | A | 7/1972 | Corkill | |
| 3,929,164 | A | 12/1975 | Richter | |
| 4,262,703 | A | 4/1981 | Moore et al. | |
| 4,307,754 | A * | 12/1981 | Muratsubaki | 138/108 |
| 4,327,775 | A * | 5/1982 | Tally | 138/103 |
| 4,374,530 | A | 2/1983 | Walling | |
| 4,447,378 | A * | 5/1984 | Gray et al. | 264/45.9 |
| 4,456,034 | A * | 6/1984 | Bixby | 138/122 |
| 4,470,433 | A | 9/1984 | Vipond et al. | |
| 4,591,320 | A | 5/1986 | Pope | |
| 4,791,963 | A | 12/1988 | Gronert et al. | |
| 5,180,014 | A | 1/1993 | Cox | |
| 5,573,063 | A | 11/1996 | Morrow | |
| 5,701,953 | A | 12/1997 | Stecker et al. | |
| 5,845,709 | A | 12/1998 | Mack et al. | |
| 6,021,818 | A * | 2/2000 | Horst et al. | 138/172 |
| 6,105,620 | A * | 8/2000 | Haberl | 138/118 |
| 6,123,123 | A | 9/2000 | Carder, Sr. et al. | |
| 6,568,610 | B1 * | 5/2003 | Ericksen | 239/588 |
| 7,686,073 | B1 | 3/2010 | Reynolds | |
| 7,740,064 | B2 | 6/2010 | McCoy et al. | |
| 2002/0108757 | A1 | 8/2002 | Traylor | |

OTHER PUBLICATIONS

BlackStorm Production System—Printout of home page from www.blackstormsystem.com.

* cited by examiner

*Primary Examiner* — Patrick F Brinson
(74) *Attorney, Agent, or Firm* — Wood, Phillips, Katz, Clark & Mortimer (57) ABSTRACT

A conduit system having a conduit with an elongate body having a length between spaced first and second ends and bounding a passageway for communication of flowable material between the first and second spaced ends. The conduit has first and second end fittings connected respectively at the first and second ends of the body. An elongate element has a length and extends between the first and second ends of the body. The elongate element has a construction that resists elongation under applied lengthwise tensile forces to a greater extent than the body. The elongate element is connected to each of the first and second end fittings and is substantially unconnected to the body over a substantial length thereof so that elongation of the body is resisted by the elongate element.

29 Claims, 5 Drawing Sheets

Fig. 11

SYSTEM FOR CONTROLLING ELONGATION OF A CONDUIT WITHIN WHICH FLOWABLE MATERIAL IS CONVEYED

BACKGROUND OF THE INVENTION

1. Field of the Invention

This invention relates to conduits as used for conveying flowable material and, more particularly, to a system for controlling elongation of such conduits under the weight of the conduit and contained material, together with the weight of any pumps, or the like, attached thereto, and supply lines for powering the pumps.

2. Background Art

Conduits are used to convey flowable materials in many different environments, and for many different applications. As one example, it is known to attach a submersible pump to the end of a conduit and to direct the pump downwardly into a well as to recover water, oil, or the like.

In certain operations, the pump will be directed downwardly into a bore or well with a depth in excess of 1,000 feet. The upper regions of the conduit are thus subjected to weight forces that are substantial, including those of the pump, the conduit, the material contained in the conduit, and power supply lines for the pump. With the conduit made from a non-metal material, these forces may cause significant elongation of the conduit, and in a worse case, failure thereof.

Typically, hoses designed for this application are braided high pressure hoses, much like thermoplastic hydraulic hoses consisting of an extruded inner core tube, one or more braids of high tensile yarns, and an extruded jacket providing abrasion and chemical resistance.

Elongation of this type of hose may cause an appreciable reduction of the cross-sectional area of the flow passageway defined thereby. This limits flow capacity and, as a result, pumping efficiency.

This elongation may be to a certain extent limited by metal, conductive wires that supply power to the pump. However, such wires may not be designed to bear the encountered weight forces, as a result of which there is a risk that the power supply to the pump may be compromised.

The above elongation problem may be aggravated by elevated temperatures at the bottom region of the well/bore, that make the conduit material even more extensible.

Attempts to reconstruct the conduit to limit detrimental elongation may introduce other problems. The tensile strength of the inner core tube and covering layers/materials is directly related to the flexural modulus for the materials from which they are constructed. To provide appreciable resistance to stretching/elongation, very stiff materials may have to be used, as a result of which the conduits become stiff and difficult to handle. This is particularly a problem where a substantial length of conduit is required and in which situations the conduit would normally be stored upon, and paid off of, a storage reel. Thus, the goals of facilitating handling and limiting elongation compete with each other.

To avoid the problems associated with conduit elongation, it is also known to provide a lifting cable that is attached to a pump and extends continuously to above ground, from where the cable can be selectively drawn upwardly and lowered to control the vertical positioning of the pump. With this system, the lifting cable itself becomes a component, separate from the conduit, that must be stored and handled by an operator. Aside from the inconvenience associated with this design, the externally located cable may have a tendency to become tangled as the pump is raised and lowered during a procedure.

This latter problem becomes even more significant in applications wherein forces applied to the conduit are not substantially vertical, whereupon the cable may become slackened and may coil or otherwise reconfigure towards a set shape that interferes with its handling.

It is further known to vary the cross-section of such conduits to allow integration of components that are less susceptible to elongation. With this design, both the weight and the cost of the conduit may be significantly increased.

As an alternative to using conduits made from thermoplastic material, metal/steel conduits can be used. Currently, metal conduit is made with a maximum of 33 foot lengths. The lengths have threaded ends that are selectively joinable, one to the next, to produce a combined, required length. This is an inconvenient and time consuming process, both in terms of the initial setup and removal of the system at the completion of a project. Even if the system is designed to be left in place after a project, any maintenance or repair that is carried out will require the sequential disconnection of the conduit lengths as the pump is elevated and accessed. Once the repair/maintenance is carried out, re-installation through the same process must be effected.

The use of a single length of conduit made from a flexible material obviates the above problems and allows the conduit to be conveniently retrieved upon, and paid off of, a storage spool. However, as noted above, if the conduit with this construction is rigid in nature, it is difficult to handle. If the conduit is flexible in nature, it is prone to the aforementioned elongation that may create operational problems, as described above.

The above, and other, problems have been contended with in the industry since there have not been developed designs that adequately and practically address those problems.

SUMMARY OF THE INVENTION

In one form of the invention, a conduit system is provided having a conduit with an elongate body having a length between spaced first and second ends and bounding a passageway for communication of flowable material between the first and second spaced ends. The conduit has first and second end fittings connected respectively at the first and second ends of the body. An elongate element has a length and extends between the first and second ends of the body. The elongate element has a construction that resists elongation under applied lengthwise tensile forces to a greater extent than the body does under corresponding applied tensile forces. The elongate element connects to each of the first and second end fittings and is substantially unconnected to the body over a substantial length thereof, between the first and second body ends, so that elongation of the body under an applied tensile force of a predetermined magnitude is resisted by the elongate element.

In one form, the elongate element is unconnected to the body fully between the first and second end fittings so that a lengthwise tensile force of at least the predetermined magnitude applied to the conduit is resisted by the elongate element acting directly between the first and second end fittings.

In one form, the elongate element resides within the passageway.

In one form, the elongate element is releasably connected to the conduit.

In one form, the conduit system further includes first and second connectors that respectively connect the elongate element to the first and second end fittings.

In one form, the first connector has a first connector part with a shoulder that cooperates with a first connector part with a shoulder on the first end fitting to allow the first connector parts to be relatively moved from a separated state in predetermined relative paths into an assembled state, wherein the shoulder on the first end fitting and first connector part abut.

In one form, the first connector has first and second connector parts that respectively cooperate with first and second connector parts on the first end fitting.

In one form, the conduit has a central axis and the first and second connector parts on the first end fitting are at diametrically opposite locations.

In one form, the first connector parts consist of a cooperating slot and projection, one each on the first connector and first end fitting, that are movable axially from a separated state into an assembled state.

In one form, the conduit has a central axis. The first connector has a V-shaped edge opening axially, with legs converging to a seat. The elongate element wraps around the V-shaped edge at the seat.

In one form, the first connector is in the form of a flat plate that engages the first end fitting at diametrically opposite locations.

In one form, the second connector is configured substantially the same as the first connector and cooperates with the second end fitting in substantially the same way that the first connector cooperates with the first end fitting.

In one form, the elongate element is made from at least one of a metal and a non-metal material.

In one form, the body is made of a reinforced thermoplastic material.

In one form, the conduit has a central axis and the first and second connectors maintain the elongate element substantially concentric with the central axis of the conduit.

In one form, the conduit has a central axis and the first connector is axially press fit to the first end fitting and is keyed to the first end fitting against turning around the central axis of the conduit.

In one form, the first and second connectors are axially press fit to the first and second end fittings in opposite axial directions.

The invention is further directed to a method for controlling elongation of a conduit with an elongate body. The body has a length between first and second ends, at which first and second end fittings are respectively provided, and bounds a passageway for communication of flowable material between the first and second spaced ends. The method includes the steps of: providing an elongate element having a construction that resists elongation under applied lengthwise tensile forces to a greater extent than the body does under corresponding applied tensile forces; and connecting the elongate element to each of the first and second end fittings in such a manner that the elongate element is substantially unconnected to the body over a substantial length thereof between the body ends and applied lengthwise tensile forces are resisted by the elongate element acting directly between the first and second end fitting.

In one form, the step of connecting the elongate element involves connecting the elongate element to the first and second end fittings with the elongate element extending through the passageway.

In one form, the step of connecting the elongate element involves connecting the elongate element through first and second connectors that are press fit respectively to the first and second end fittings, without requiring any separate fasteners acting between the first and second connectors and the respective first and second end fittings.

DETAILED DESCRIPTION OF THE PREFERRED EMBODIMENT

Figure 1:
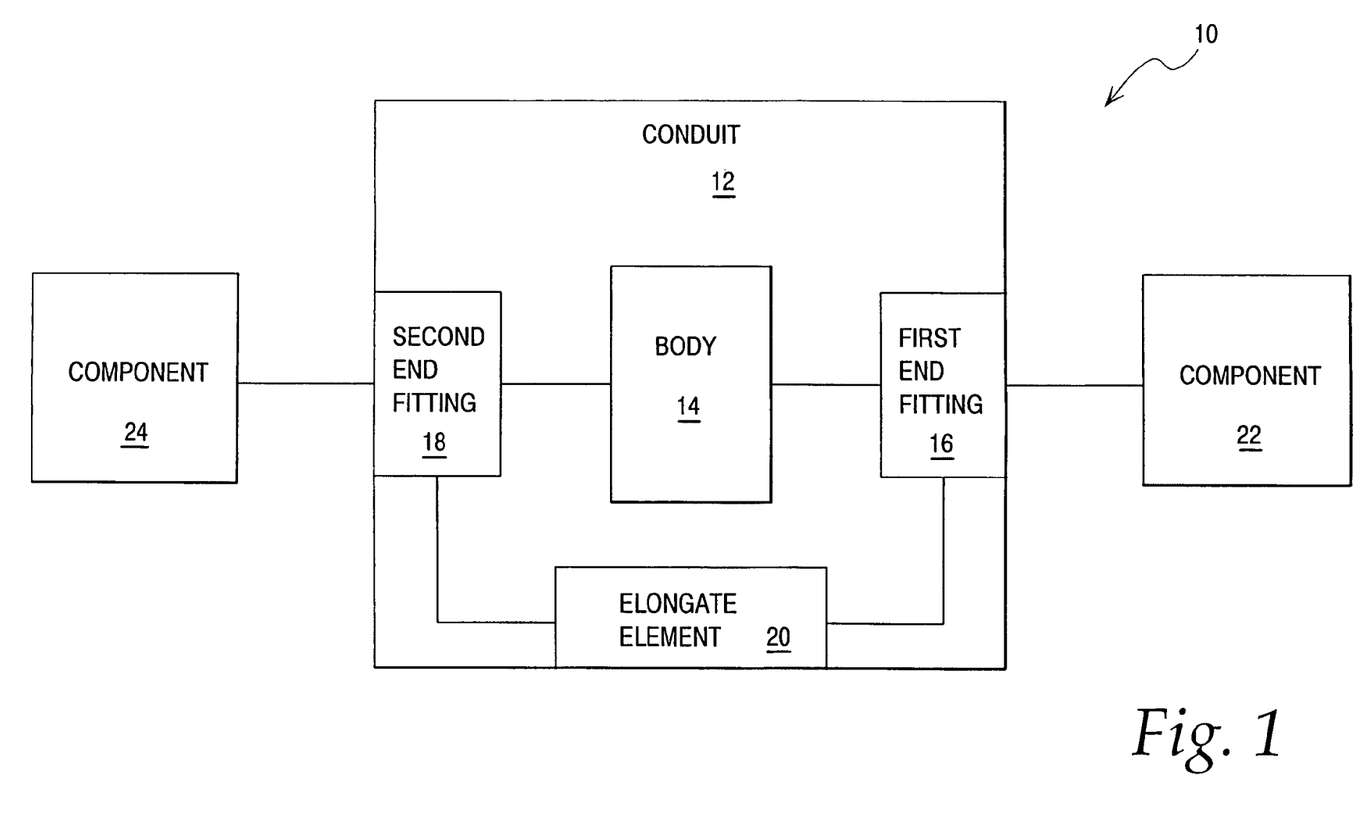
FIG. 1 is a schematic representation of an assembly including a conduit system, according to the present invention, connected at each of its ends to a separate component.

In FIG. 1, a conduit system, according to the present invention, is shown at 10. The conduit system 10 consists of a conduit 12 with an elongate body 14 having a length between spaced ends and bounding a passageway for communication of flowable material between the ends. The nature of the flowable material is not critical to the present invention and may be in the form of a gas, liquid, or a particulate material.

First and second end fittings 16, 18 are connected at the spaced ends of the body 14.

An elongate element 20 extends between the spaced ends of the body 14 and is connected to the first and second end fittings 16, 18 and substantially unconnected to the body 14 over a substantial length thereof between the end fittings 16, 18. The elongate element 20 has a construction that resists elongation under applied lengthwise tensile forces to a greater extent than the body 14 does under corresponding applied tensile forces.

The conduit system 10 is not limited in terms of its application. The first and second end fittings 16, 18 are each designed to be respectively connected to at least one other component 22, 24. The components 22, 24 may take virtually a limitless number of different forms. As but one example, one or both of the components 22, 24 might be similar conduit systems 10 selected to collectively produce a desired overall conduit length. In one form, one of the components 22, 24 could be in the form of a pump that is lowered into a bore/well. Operation of the pump causes delivery of a flowable material through the body 14 to an appropriate point of use above ground.

The conduit system 10 is designed for use in virtually any environment, and for any application in which flowable material is conveyed and in which the body 14 is subjected to lengthwise tensile forces that tend to effect elongation/lengthening thereof, be these forces applied through vertical weight loading, horizontal loading, or otherwise.

One specific form of the conduit system 10 will now be described with respect to FIGS. 2-9, with it being understood that this particular embodiment is only exemplary of the many different designs that are contemplated within the broad inventive disclosure herein.

Figures 2, 3:
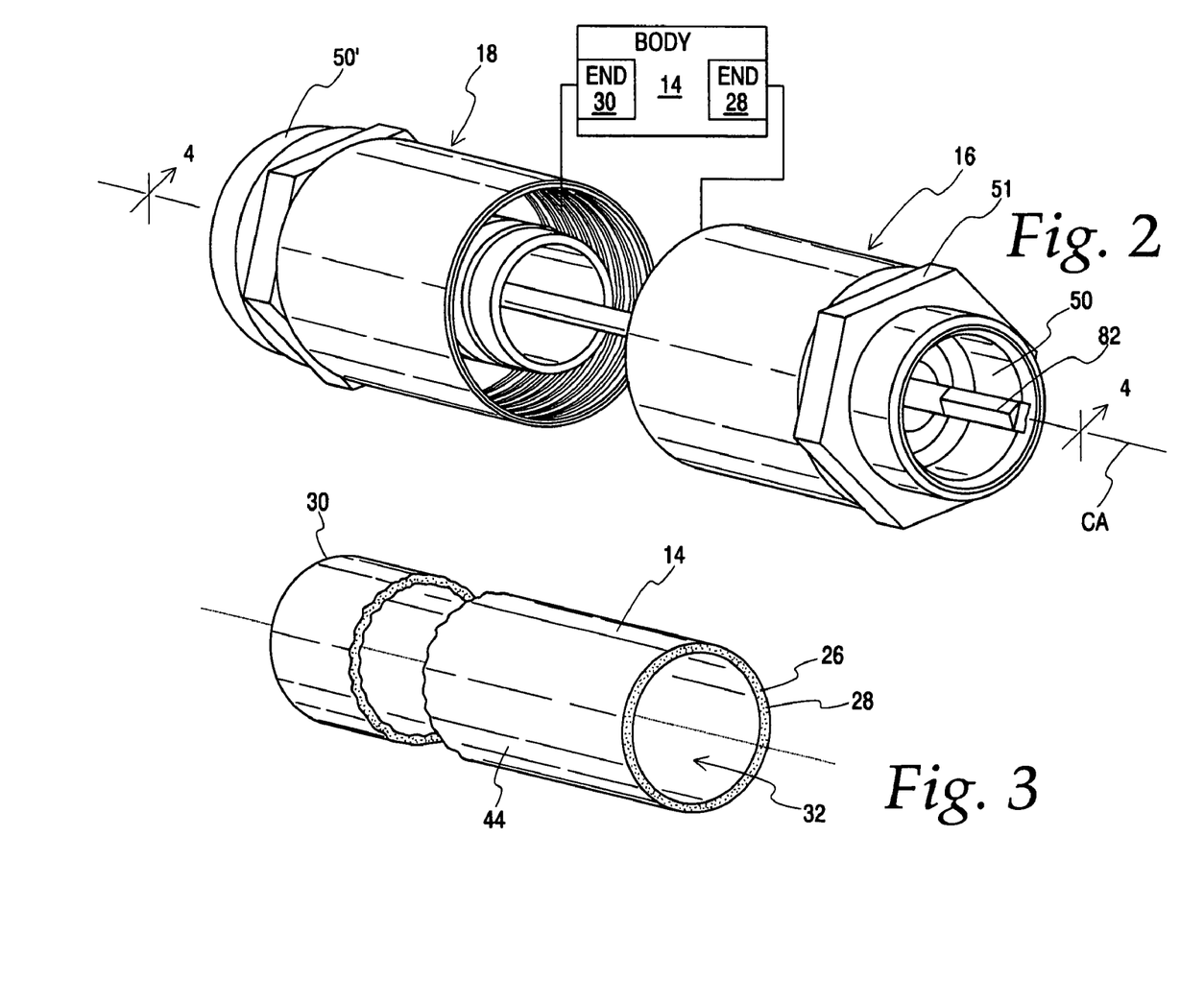
FIG. 2 is a partially schematic, perspective view of one form of the conduit system in FIG. 1 and including a body with spaced end fittings and an elongate element attached to the end fittings to control elongation of the body.
FIG. 3 is a fragmentary, perspective view of the body on the conduit system in FIG. 2.

The body 14 has an annular cross-sectional shape and may be made from an elastomeric material with reinforcement provided, as by embedded fibers 26. The precise composition of the body 14 is not critical to the present invention. The body 14 may be made from one layer or a plurality of layers, with different compositions and constructions. One exemplary construction is shown in pending U.S. application Ser. No. 10/707,925, commonly owned herewith. The disclosure in that application is incorporated herein by reference.

It suffices to say that the body 14 is elongate with a length between spaced ends 28, 30 and bounds a passageway 32 for communication of flowable material between the ends 28, 30. Separate end fittings 16, 18 are connected respectively to the spaced ends 28, 30 of the body 14.

Figure 4:
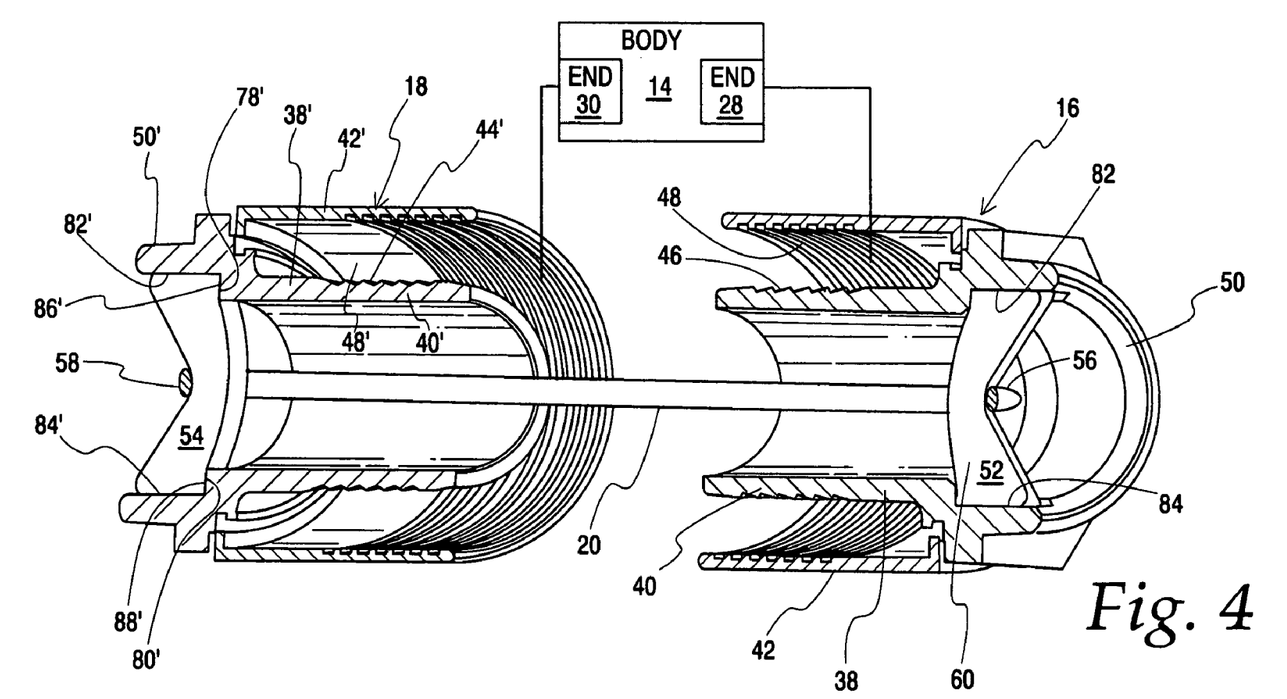
FIG. 4 is a cross-sectional view of the conduit system taken along line 4-4 of FIG. 2.

The end fitting 16 consists of a hose stem 38 with a barbed male insert 40 that is directed into the passageway 32 at the body end 28. A ferrule 42 extends around the outside surface 44 of the body 14 and is crimped to compressibly capture the body end 28 against the barbed, outside surface 46 of the male insert 40. The inside surface 48 of the ferrule 42 is contoured, as through the depicted annular ribbing, to more positively grip the body end 28 after crimping.

The opposite end of the hose stem 38 defines a connecting part 50 that cooperates with a complementarily-configured connecting part (not shown) on the component 22. The connecting part 50 is typically threaded and can be turned by a wrench engaging a polygonally-shaped outer surface 51.

The end fitting 18 has substantially the same construction as the end fitting 16, with like parts designated with the same reference numeral and a "'" designation. That is, the end fitting 18 has a stem 38' with a barbed outside surface 44'. A ferrule 42' has a contoured inside surface 48'. The hose stem 38' terminates at a connecting part 50' that is configured to cooperate with a complementarily-shaped connecting part (not shown) on the component 24.

Typically, the end fittings 16, 18 will be made with metal components. Through the above-described arrangement, the end fittings 16, 18 become rigidly, fixedly attached to the body ends 28, 30 so that a unitary conduit 12 is defined.

In the absence of the elongate element 20, as described in greater detail hereinbelow, tensile forces applied to the end fittings 16, 18 are borne by the body 14. These tensile forces may be generated by the weight of the conduit 12 by itself, which increases as the conduits 12 are joined end to end. The weight of a pump that is connected to the conduit system 10, as one of the components 22, 24, adds additionally to the weight and applied tensile forces upon the body 14, as does the weight of any material within the passageway 32 and that of any power supply lines for the pump.

These same tensile forces may be applied in an environment through other than strictly weight loading as in the deep well application. For example, lengths of conduit 12 may be generally horizontally oriented in use but subjected to loading forces, as when associated components 22, 24 are placed under tension or relatively moved.

As described above, in the event that a tensile force of a predetermined magnitude, as determined by the particular conduit construction, is applied to the conduit 12, it will begin to elongate in a lengthwise direction. This elongation may not only distort the body 14, but may reduce the cross-sectional area of the passageway 32 to the point that pumping volume and efficiency are compromised. At the same time, any electrical conductors that have been extended along the length of the body 14, as to power one of the components 22, 24, such as a pump, may likewise be elongated under a substantial tensile force, potentially to the point of failure.

The above problems are addressed by incorporating the elongate element 20. As previously noted, the elongate element 20 has a construction that resists elongation along the lengthwise extent of the conduit system 10, parallel a central axis CA thereof, to a greater extent than the body 14 does under corresponding applied tensile forces.

Connectors 52, 54 respectively connect elongate element ends 56, 58 to the end fittings 16, 18, respectively. As seen clearly in FIG. 4, the elongate element 20 is substantially unconnected to the body 14 over a substantial length, and preferably over the entire length, thereof between the first and second body ends 28, 30. Thus, elongation forces applied to the body 14 through the end fittings 16, 18 are resisted by the elongate element 20 acting directly between the end fittings 16, 18.

By characterizing the elongate element 20 as being "unconnected" to the body 14, it is intended that while there may be contact and/or some sort of joinder between the elongate element 20 and body 14 over an unconnected length, substantially the entirety of the tensile forces are transmitted through the elongate element 20 directly between the end fittings 16, 18.

While, as shown in FIG. 1, the invention contemplates both internal and external mounting of the elongate element 20, in a preferred form, the elongate element 20 resides within the passageway 32. As depicted, the elongate element 20 is maintained in substantially concentric alignment with the central axis CA of the conduit 12, and overall conduit system 10, by the connectors 52, 54. Each of the connectors 52, 54 has substantially the same construction and thus the detailed description herein will be limited to exemplary connector 52.

Figure 5:
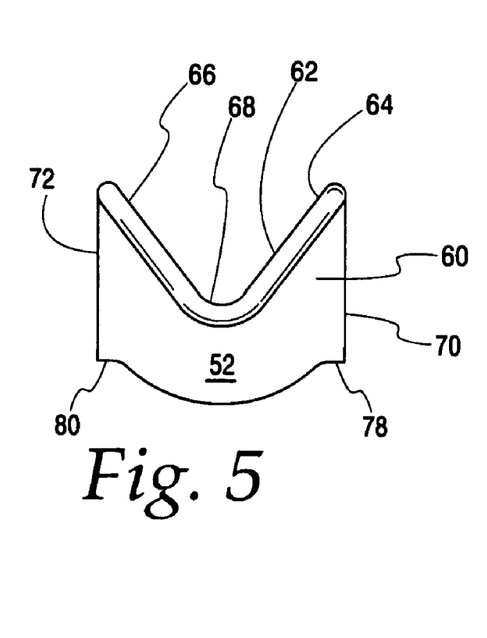
FIG. 5 is an end, elevation view of a connector through which an end of the elongate element is connected to one end fitting.
Figure 6:
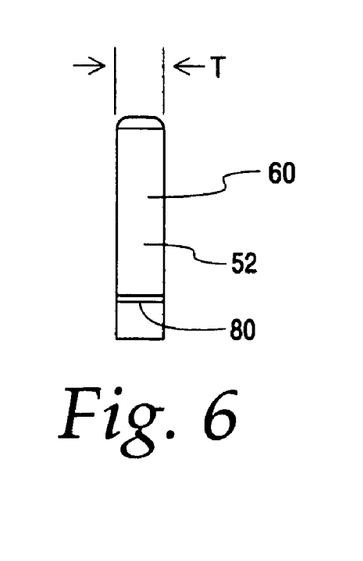
FIG. 6 is a side elevation view of the connector in FIG. 5.
Figure 7:
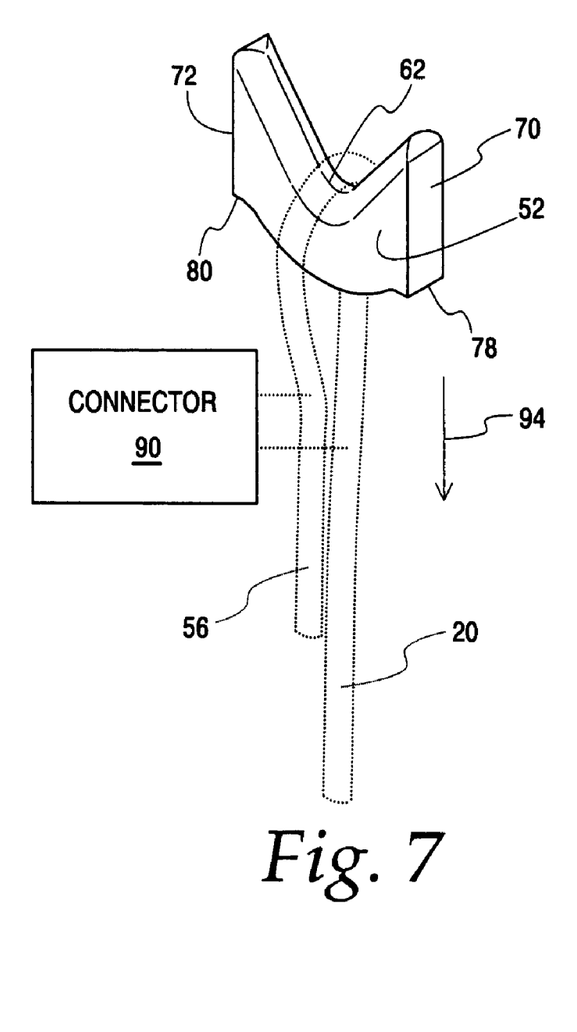
FIG. 7 is a perspective view of the connector in FIGS. 5 and 6 with an end of the elongate element wrapped therearound.

The connector 52 has a body 60 in the form of a flat plate with a V-shaped edge 62 formed therein and opening in an axial direction. The edge 62 consists of legs 64, 66 that converge to a curved seat 68. The edge 62 is angled/rounded, as seen in FIGS. 5 and 7, thereby to eliminate sharp edges that may nick or sever the elongate element 20.

Figures 8, 9, 10:
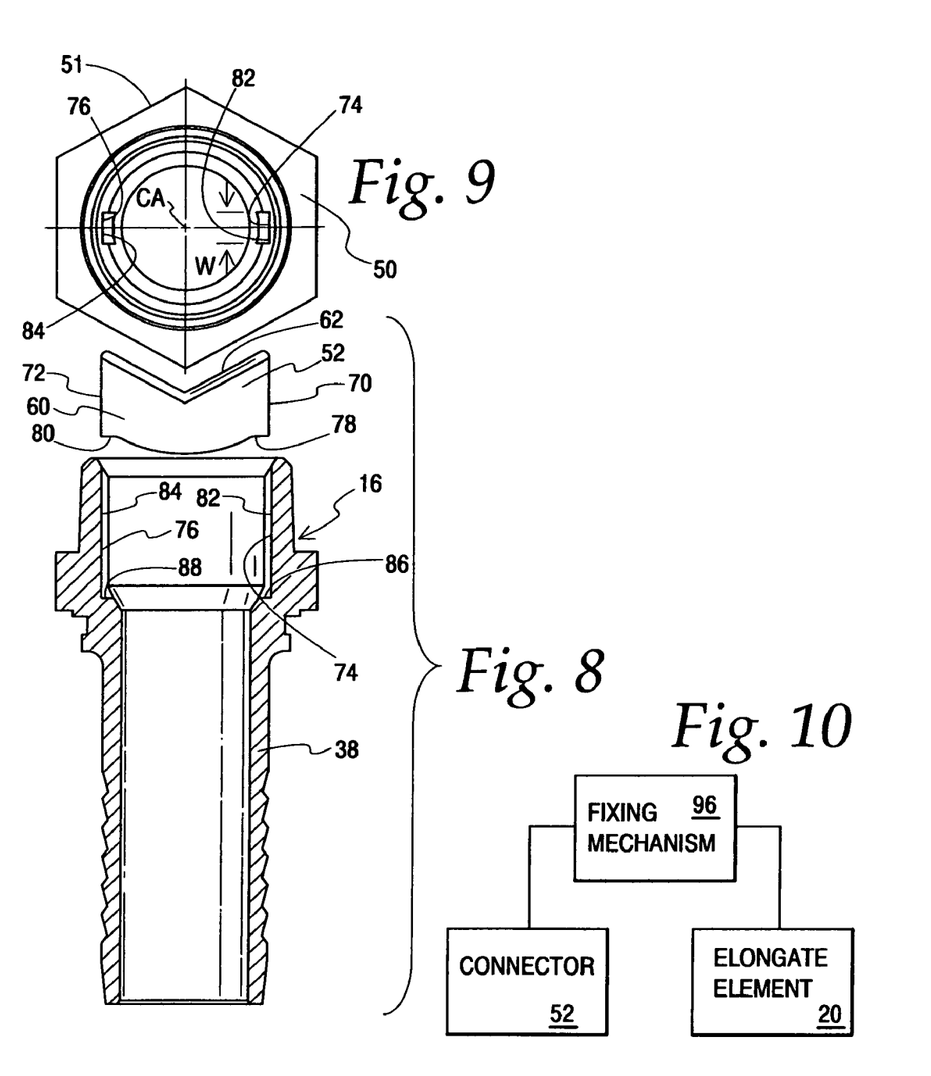
FIG. 8 is a cross-sectional view of one of the end fittings with the connector and end fitting in spaced relationship in a pre-assembly state.
FIG. 9 is an end view of the end fitting in FIG. 8 to which the connector is attached.
FIG. 10 is a schematic representation of a fixing mechanism for joining a connector to an end of an elongate element.

The connector 52 has connector parts 70, 72 that cooperate, one each, with connector parts 74, 76, respectively, on the end fitting 16. In this embodiment, the connector parts 70, 72 on the connector 52 are in the form of projections with axially facing shoulders 78, 80, respectively. The connector parts 74, 76 on the end fitting 16 are in the form of axially extending slots 82, 84 terminating at shoulders 86, 88, facing axially oppositely to the direction faced by the shoulders 78, 80 on the connector 52.

The slots 82, 84 are at diametrically opposite locations at which the connector parts 70, 72 cooperate therewith. The slots 82, 84 have a circumferential width W that is slightly greater than the width/thickness T for the connector body 60. Through this arrangement, the connector parts 70, are axially slidable into the slots 82, 84, respectively, with limited resistance. Once the connector parts 70, 72 are in the slots 82, 84, the connector 52 is keyed against turning relative to the end fitting 16 around the central axis CA.

More particularly, the connector 52 is installed with the connector 52 and end fitting 16 placed initially in a pre-assembly/separated state, as shown in FIG. 8, wherein the connector parts 70, 72 are aligned over the slots 82, 84, respectively. By then translating the connector 52 axially toward the end fitting 16, the connector parts 70, 72 shift through the slots 82, until the connector 52 and end fitting 16 realize an assembled state wherein the shoulders 78, 80 on the connector 52 respectively abut the shoulders 86, 88 on the end fitting 16.

The slots 82, 84 have lengths in an axial direction that is substantially greater than the axial extent of the connector body 60, thereby to facilitate assembly and avoid inadvertent separation, as explained in greater detail below. As can be seen, the connector 52 is simply axially press-fit to the end fitting 16 and is consistently maintained in the assembled state wherein it is keyed to the end fitting 16 so as not to be capable of turning around the central axis CA relative to the end fitting 16.

The elongate element 20 is typically in the form of a cable or cord. The elongate element 20 may be made from a solid piece or may have a braided construction. The elongate element 20 may be made from metal material, such as stainless steel, or from a non-metal material, such as woven fibers. The elongate element 20 alternatively may be made from a composite material. The precise construction thereof is not critical to the present invention.

It is preferred, though not required, that the elongate element 20 is capable of being formed so as to be wrapped around the edge 62 on the connector 52 and suitably secured, as by being doubled against itself and fixed in that configuration by an appropriate connector 90, as seen in FIG. 7. The connector 90 may be a crimp connector, a wrap, or any other suitable device or mechanism known to those skilled in the art, to maintain the end 56 of the elongate element 20 in the looped configuration shown in FIG. 7 so as to thereby be fixed against separation from the connector 52.

More specifically, the invention contemplates virtually any mechanism that maintains the connector 52 and end 56 of the elongate element 20 together in a manner whereby an axial force upon the elongate element 20 in the direction of the arrow 94 is borne by the connector 52. Such mechanism may be engaged through pre-assembly or may be engaged on site during setup. This generic showing appears in FIG. 10, wherein the fixing mechanism of this generic nature is identified at 96 to act, in virtually a limitless number of different manners, between the connector 52 and elongate element 20.

The connector 54 has substantially the same configuration as the connector 52 and cooperates with the end fitting 18 in substantially the same way that the connector 52 cooperates with the end fitting 16. Accordingly, the connectors 52, 54 are press-fit into their assembled states by translational movement relative to their respective end fittings 16, 18 in axially opposite directions. The connector 54 has shoulders 78', 80', corresponding to the shoulders 78, 80, that cooperate with axially oppositely facing shoulders 86', 88' on the end fitting 18. Diametrically located slots 82', 84' on the end fitting 18 correspond to the slots 82, 84 in the end fitting 16.

The elongate element end 58 cooperates with the connector 54 preferably in the same manner that the elongate element end 56 cooperates with the connector 52, though this is not a requirement.

With both connectors 52, 54 in place, the elongate element 20 is slightly slackened, whereby the connectors 52, 54 are allowed to move axially in their respective slots 82, 84, 82', 84' slightly away from each other. The slots 82, 84, 82', 84' have a sufficient axial length that neither of the connectors 52, 54 will be prone to shifting fully out of its respective slot with the elongate element 20 slackened. Once the body 14 is placed under tension with forces adequate to effect elongation, the connectors 52, 54 bottom out in their respective slots 82, 84, 82', 84' at which point the shoulders 78, 86, 80, 88; 78', 86', 80', 88' abut to thereby resist tensile force application that would elongate the body 18.

Figure 11:
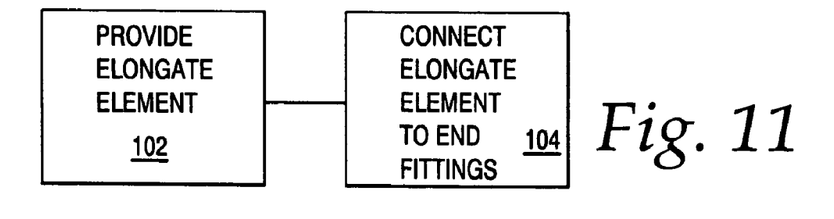
FIG. 11 is a block diagram representation of a method of controlling elongation of a conduit with an elongate body, according to the present invention.

With the inventive structure, the invention contemplates a method of controlling elongation of a conduit as set forth in block diagram form in FIG. 11. As shown at block 102, the method contemplates providing an elongate element having a construction that resists elongation under applied lengthwise tensile forces to a greater extent than the body does under corresponding applied tensile forces. As shown at block 104, the elongate element is connected to each of the end fittings 16, 18 in such a manner that the elongate element is substantially unconnected to the body over a substantial length thereof between the body ends and applied lengthwise tensile forces are resisted by the elongate element acting directly between the end fittings.

The method can be practiced by extending the elongate element 20 either within the passageway 32 or along the outside of the conduit 12.

The connectors 52, 54 can be pre-assembled to the elongate element 20 or connected thereto after the connectors 52, 54 are press-fit at least partially into place.

Figure 12:
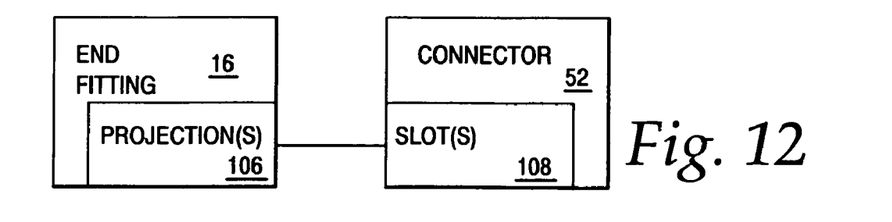
FIG. 12 is a schematic representation of connector parts cooperating between a connector and end fitting, according to the invention.

Many other variations from the basic structure described hereinabove are contemplated. For example, as shown in FIG. 12, while the connector parts 70, 72 on the connector 52 are shown as projections, with cooperating connector parts/slots 82, 84 on the end fitting 16, these components could be reversed so that the corresponding projections 106 are provided on the end fitting 16, with cooperating slots 108 on the connector 52.

The foregoing disclosure of specific embodiments is intended to be illustrative of the broad concepts comprehended by the invention.

The invention claimed is:

1. A conduit system comprising:
    a conduit with an elongate body having a length along an axis of the conduit between spaced first and second ends and bounding a passageway for communication of flowable material between the first and second spaced ends,
    the conduit further comprising first and second end fittings connected respectively at the first and second ends of the body;
    an elongate element having a length and extending between the first and second ends of the body,
    the elongate element having a construction that resists elongation under applied lengthwise tensile forces to a greater extent than the body does under corresponding applied tensile forces,
    the elongate element connected to each of the first and second end fittings and substantially unconnected to the body over a substantial length thereof between the first and second body ends so that elongation of the body under an applied tensile force of a predetermined magnitude is resisted by the elongate element; and
    a first connector that connects the elongate element to the first end fitting,
    the elongate element wrapped around a radially extending part of the first connector.

2. The conduit system according to claim 1 wherein the elongate element is unconnected to the body fully between the first and second end fittings so that a lengthwise tensile force of at least the predetermined magnitude applied to the conduit is resisted by the elongate element acting directly between the first and second end fittings.

3. The conduit system according to claim 1 wherein the elongate element resides within the passageway.

4. The conduit system according to claim 1 wherein the elongate element is releasably connected to the conduit.

5. The conduit system according to claim 4 wherein the conduit system further comprises a second connector that connects the elongate element to the second end fitting.

6. The conduit system according to claim 5 wherein the first connector comprises a first connector part with a shoulder that cooperates with a first connector part with a shoulder on the first end fitting to allow the first connector parts to be relatively moved from a separated state in pre-determined relative paths into an assembled state wherein the shoulders on the first end fitting and first connector part abut.

7. The conduit system according to claim 5 wherein the first connector comprises first and second connector parts that respectively cooperate with first and second connector parts on the first end fitting.

8. A conduit system comprising:
a conduit with an elongate body having a length between spaced first and second ends and bounding a passageway for communication of flowable material between the first and second spaced ends,
the conduit further comprising first and second end fittings connected respectively at the first and second ends of the body; and
an elongate element having a length and extending between the first and second ends of the body,
the elongate element having a construction that resists elongation under applied lengthwise tensile forces to a greater extent than the body does under corresponding applied tensile forces,
the elongate element connected to each of the first and second end fittings and substantially unconnected to the body over a substantial length thereof between the first and second body ends so that elongation of the body under an applied tensile force of a predetermined magnitude is resisted by the elongate element,
wherein the elongate element is releasably connected to the conduit,
wherein the conduit system further comprises first and second connectors that respectively connect the elongate element to the first and second end fittings,
wherein the first connector comprises first and second connector parts that respectively cooperate with first and second connector parts on the first end fitting,
wherein the conduit has a central axis and the first and second connector parts on the first end fitting are at diametrically opposite locations.

9. The conduit system according to claim 8 wherein the first connector parts comprise a cooperating slot and projection, one each on the first connector and first end fitting, that are movable axially from a separated state into an assembled state.

10. The conduit system according to claim 5 wherein the elongate element is wrapped around the part of the first connector so as to be doubled against itself.

11. A conduit system comprising:
a conduit with an elongate body having a length between spaced first and second ends and bounding a passageway for communication of flowable material between the first and second spaced ends,
the conduit further comprising first and second end fittings connected respectively at the first and second ends of the body; and
an elongate element having a length and extending between the first and second ends of the body,
the elongate element having a construction that resists elongation under applied lengthwise tensile forces to a greater extent than the body does under corresponding applied tensile forces,
the elongate element connected to each of the first and second end fittings and substantially unconnected to the body over a substantial length thereof between the first and second body ends so that elongation of the body under an applied tensile force of a predetermined magnitude is resisted by the elongate element,
wherein the elongate element is releasably connected to the conduit,
wherein the conduit system further comprises first and second connectors that respectively connect the elongate element to the first and second end fittings,
wherein the elongate element is wrapped around a part of the first connector,
wherein the conduit has a central axis, the first connector has a V-shaped edge opening axially with legs converging to a seat and the elongate element wraps around the V-shaped edge at the seat.

12. The conduit system according to claim 11 wherein the first connector is in the form of a flat plate that engages the first end fitting at diametrically opposite locations.

13. The conduit system according to claim 12 wherein the second connector is configured substantially the same as the first connector and cooperates with the second end fitting in substantially the same way that the first connector cooperates with the first end fitting.

14. The conduit system according to claim 1 wherein the elongate element is made from at least one of a metal and a non-metal material.

15. The conduit system according to claim 1 wherein the body comprises a reinforced thermoplastic material.

16. The conduit system according to claim 5 wherein the conduit has a central axis and the first and second connectors maintain the elongate element substantially concentric with the central axis of the conduit.

17. A conduit system comprising:
a conduit with an elongate body having a length between spaced first and second ends and bounding a passageway for communication of flowable material between the first and second spaced ends,
the conduit further comprising first and second end fittings connected respectively at the first and second ends of the body; and
an elongate element having a length and extending between the first and second ends of the body,
the elongate element having a construction that resists elongation under applied lengthwise tensile forces to a greater extent than the body does under corresponding applied tensile forces,
the elongate element connected to each of the first and second end fittings and substantially unconnected to the body over a substantial length thereof between the first and second body ends so that elongation of the body under an applied tensile force of a predetermined magnitude is resisted by the elongate element,
wherein the elongate element is releasably connected to the conduit,
wherein the conduit system further comprises first and second connectors that respectively connect the elongate element to the first and second end fittings,
wherein the conduit has a central axis and the first connector is axially press fit to the first end fitting and is keyed to the first end fitting against turning around the central axis of the conduit.

18. A conduit system comprising:
a conduit with an elongate body having a length between spaced first and second ends and bounding a passageway for communication of flowable material between the first and second spaced ends,
the conduit further comprising first and second end fittings connected respectively at the first and second ends of the body; and
an elongate element having a length and extending between the first and second ends of the body,
the elongate element having a construction that resists elongation under applied lengthwise tensile forces to a greater extent than the body does under corresponding applied tensile forces,
the elongate element connected to each of the first and second end fittings and substantially unconnected to the body over a substantial length thereof between the first and second body ends so that elongation of the body under an applied tensile force of a predetermined magnitude is resisted by the elongate element,
wherein the elongate element is releasably connected to the conduit,
wherein the conduit system further comprises first and second connectors that respectively connect the elongate element to the first and second end fittings,
wherein the first and second connectors are axially press fit to the first and second end fittings in opposite axial directions.

19. A method of controlling elongation of a conduit with an elongate body with a length along an axis of the conduit between first and second spaced ends at which first and second end fittings are respectively provided and bounding a passageway for communication of flowable material between the first and second spaced ends, the method comprising the steps of:
providing an elongate element having a construction that resists elongation under applied lengthwise tensile forces to a greater extent than the body does under corresponding applied tensile forces providing a first connector in the form of a flat plate; and
connecting the elongate element to each of the first and second end fittings in such a manner that the elongate element is substantially unconnected to the body over a substantial length thereof between the body ends and applied lengthwise tensile forces are resisted by the elongate element acting directly between the first and second end fittings, wherein the step of connecting the elongate element to the first end fitting comprises connecting the elongate element to the flat plate with the flat plate radially spanning diametrically the first end fitting.

20. A method of controlling elongation of a conduit with an elongate body with a length between first and second spaced ends at which first and second end fittings are respectively provided and bounding a passageway for communication of flowable material between the first and second spaced ends, the method comprising the steps of:
providing an elongate element having a construction that resists elongation under applied lengthwise tensile forces to a greater extent than the body does under corresponding applied tensile forces; and
connecting the elongate element to each of the first and second end fittings in such a manner that the elongate element is substantially unconnected to the body over a substantial length thereof between the body ends and applied lengthwise tensile forces are resisted by the elongate element acting directly between the first and second end fittings,
wherein the step of connecting the elongate element comprises connecting the elongate element through first and second connectors that are press fit respectively to the first and second end fittings without requiring any separate fasteners acting between the first and second connectors and respective first and second end fittings.

21. The method of controlling elongation of a conduit with an elongate body according to claim 20 wherein the step of connecting the elongate element comprises connecting the elongate element to the first and second end fittings so that the elongate element extends through the passageway.

22. The conduit system according to claim 8 wherein the first connector is in the form of a flat plate.

23. The conduit system according to claim 22 wherein the flat plate has a V-shaped edge opening in an axial direction against which the elongate element bears.

24. The conduit system according to claim 18 wherein the first and second end fittings have axially oppositely facing shoulders to which the first and second connectors abut as the first and second connectors are axially press fit to the first and second end fittings, the axially oppositely facing shoulders abutting to the first and second connectors with the body under the applied tensile force.

25. The conduit system according to claim 1 wherein the first connector has an axially facing edge against which the wrapped elongate element bears.

26. The conduit system according to claim 25 wherein the axially facing edge has a V-shaped portion against which the wrapped elongate element bears.

27. The conduit system according to claim 1 wherein the first connector is in the form of a flat plate.

28. The conduit system according to claim 1 wherein the first connector has diametrically oppositely projecting legs.

29. The conduit system according to claim 28 wherein the legs converge to a V-shaped edge against which the wrapped elongate element bears.

* * * * *